United States Patent [19]
Pinkowski

[11] Patent Number: 5,606,308
[45] Date of Patent: Feb. 25, 1997

[54] METHOD AND SYSTEM FOR CONTROLLING THE ILLUMINATION OF A VEHICULAR LAMP AND FOR MONITORING THE STATE OF A SWITCH CONNECTED THERETO

[75] Inventor: Mark C. Pinkowski, Livonia, Mich.

[73] Assignee: Kelsey-Hayes Company, Livonia, Mich.

[21] Appl. No.: 511,685

[22] Filed: Aug. 7, 1995

[51] Int. Cl.⁶ .................................................. B60Q 11/00
[52] U.S. Cl. .......................... 340/458; 340/438; 340/459; 340/471; 340/906; 340/641; 340/931
[58] Field of Search ...................................... 340/458, 438, 340/459, 469, 471, 914, 906, 641, 642, 931, 953

[56] References Cited

U.S. PATENT DOCUMENTS

| | | | |
|---|---|---|---|
| 3,818,429 | 6/1974 | Meyer et al. ............................ | 340/914 |
| 4,037,195 | 7/1977 | Wojslawowicz ........................ | 340/471 |
| 4,228,419 | 10/1980 | Anderson ............................... | 340/906 |
| 4,277,772 | 7/1981 | Kastura et al. ......................... | 340/459 |
| 5,231,373 | 7/1993 | Freeman et al. ........................ | 340/469 |
| 5,453,939 | 9/1995 | Hoffman et al. ....................... | 340/438 |

Primary Examiner—Jeffrey Hofsass
Assistant Examiner—Davetta C. Woods
Attorney, Agent, or Firm—MacMillan, Sobanksi & Todd

[57] ABSTRACT

A method and system for controlling the illumination of a vehicular lamp and for monitoring the state of a switch electrically connected thereto. A feedback signal corresponding to a state of the switch is generated by a feedback circuit. A control signal is generated by a controller based on the feedback signal. A lamp drive signal is generated by a lamp driver based on the control signal for illuminating the lamp. A single multiplexed connector provides the lamp drive signal to the lamp during a drive operating mode and the feedback signal from the switch to the controller during a feedback operating mode.

12 Claims, 3 Drawing Sheets

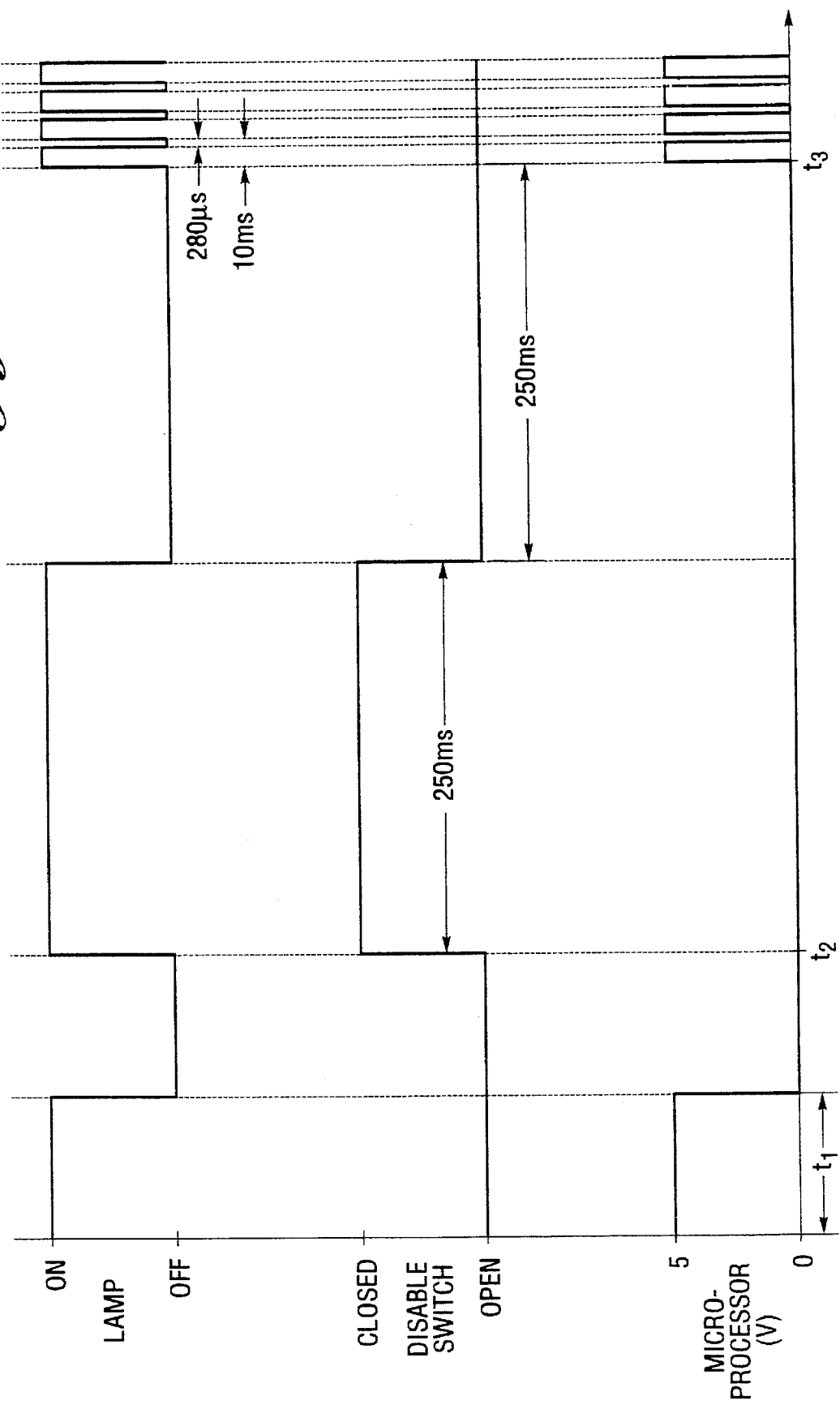

METHOD AND SYSTEM FOR CONTROLLING THE ILLUMINATION OF A VEHICULAR LAMP AND FOR MONITORING THE STATE OF A SWITCH CONNECTED THERETO

TECHNICAL FIELD

This invention relates to methods and systems for controlling the illumination of a vehicular lamp and for monitoring the state of a switch connected thereto.

BACKGROUND ART

When a vehicle is in a traction control mode, the object is to keep the drive wheels from spinning relative to the road surface. This is accomplished by systematically applying and releasing braking pressure and/or reducing engine torque so that the wheels are always at approximately the maximum rotational speed of engagement with the road surface whereby the wheels maintain traction and do not begin to slip relative to the road surface.

Typically, a lamp is provided for indicating whether the traction control system is enabled or disabled. A switch is also normally provided to allow a user of the vehicle to enable or disable the traction control system thereby causing the lamp to be either ON or OFF. The lamp and the switch each typically require a separate connection to a common microcontroller.

DISCLOSURE OF THE INVENTION

It is thus a general object of the present invention to provide a method and system for controlling the illumination of a vehicular lamp and for monitoring the state of a switch associated therewith.

In carrying out the above objects and other objects, features and advantages, of the present invention, a method is provided for determining the state of a switch and controlling the illumination of a vehicular lamp accordingly irrespective of whether the microprocessor is driving the lamp. The method includes generating a feedback signal corresponding to the state of the switch, generating a control signal based on the feedback signal, and generating a lamp drive signal for illuminating the lamp based on the control signal. The method also includes providing the lamp drive signal to the lamp during the drive operating mode and providing the feedback signal to the controller during the feedback operating mode.

In further carrying out the above objects and other objects, features and advantages, of the present invention, a system is also provided for carrying out the steps of the above described method. The system includes a controller for generating a control signal, a lamp driver for generating a lamp drive signal in response to the control signal from the controller for illuminating the lamp, a single multiplexed electrical connector, and a feedback circuit adapted to be electrically connected to the switch and the controller. The system has a drive operating mode and a feedback operating mode wherein the electrical connector provides the lamp driver to the lamp during the drive operating mode and the feedback circuit to the switch during the feedback operating mode.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 4 is a timing diagram illustrating the general sequence of operation of the present invention.

BEST MODES FOR CARRYING OUT THE INVENTION

The present invention will be described in conjunction with a traction control system. However, the present invention may be used in other applications.

Figure 1:
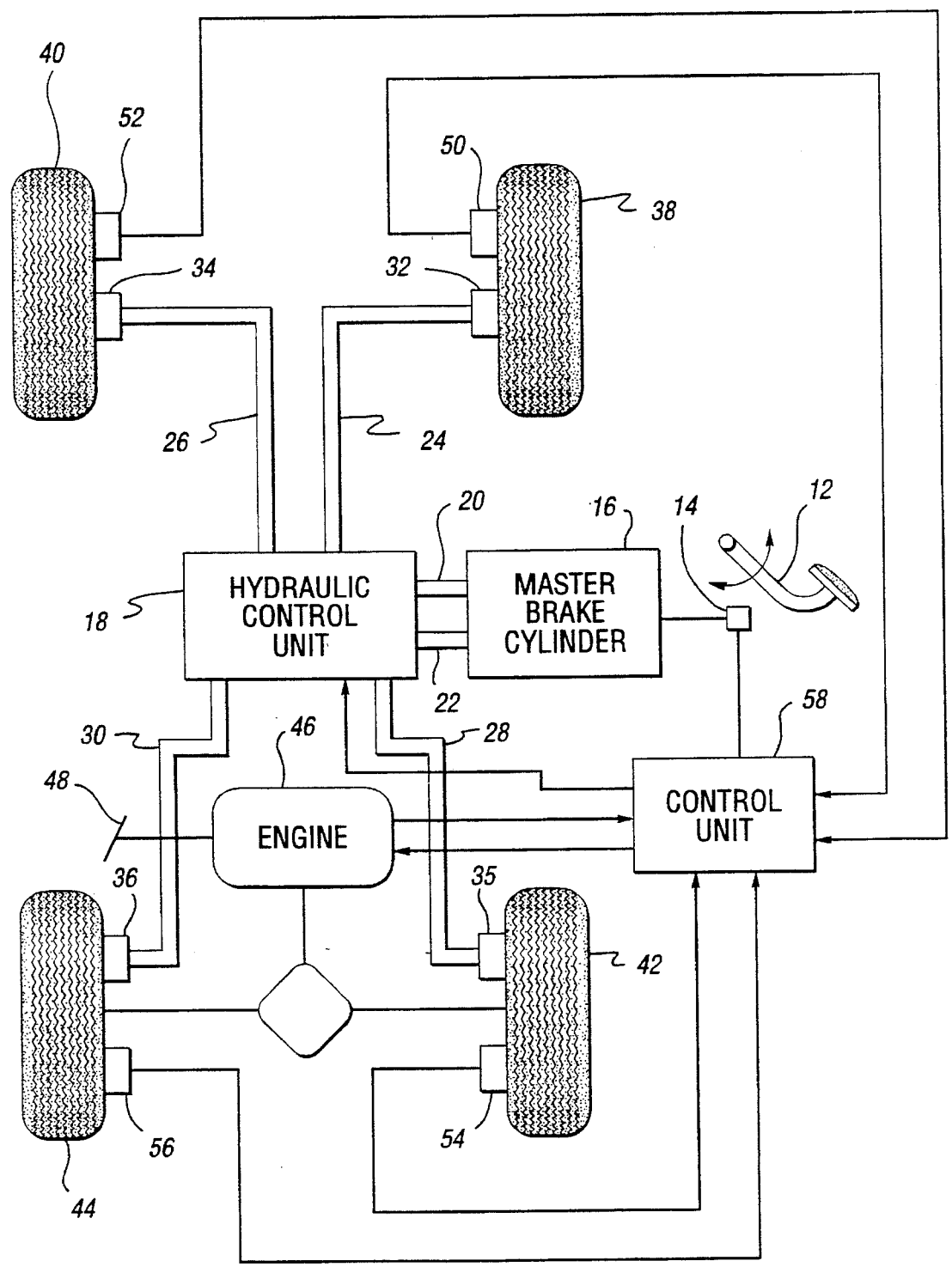
FIG. 1 is a schematic diagram of a vehicle including a vehicle traction control system.

Referring now to FIG. 1, a schematic diagram of a motor vehicle including an ordinary passenger vehicle traction control (TC) system is shown. The vehicle includes a brake pedal 12, a brake switch 14 and a master brake cylinder 16. Coupled to the master brake cylinder 16 is a hydraulic control unit 18 having control valves (not shown) and a control pump (not shown). The vehicle further includes brake fluid conduits 20, 22, 24, 26, 28 and 30, front brakes 32, 34, rear brakes 35, 36, as well as a right front wheel 38, a left front wheel 40, a right rear wheel 42 and a left rear wheel 44. The vehicle also includes an engine 46 coupled to a throttle 48 for controlling the torque of the engine 46.

The TC system comprises wheel speed sensors 50, 52, 54 and 56 for sensing the speed of each of the wheels 38, 40, 42 and 44, respectively, and a control unit 58. Each of the wheel speed sensors 50, 52, 54 and 56 are operatively connected to the control unit 58, which is itself operatively connected to the engine 46 and the hydraulic control unit 18. Such operative connections are preferably electrical, but may also be other types of connections, such as fiber optic. The control unit 58 takes the form of a commercially available microcontroller.

Figure 2:
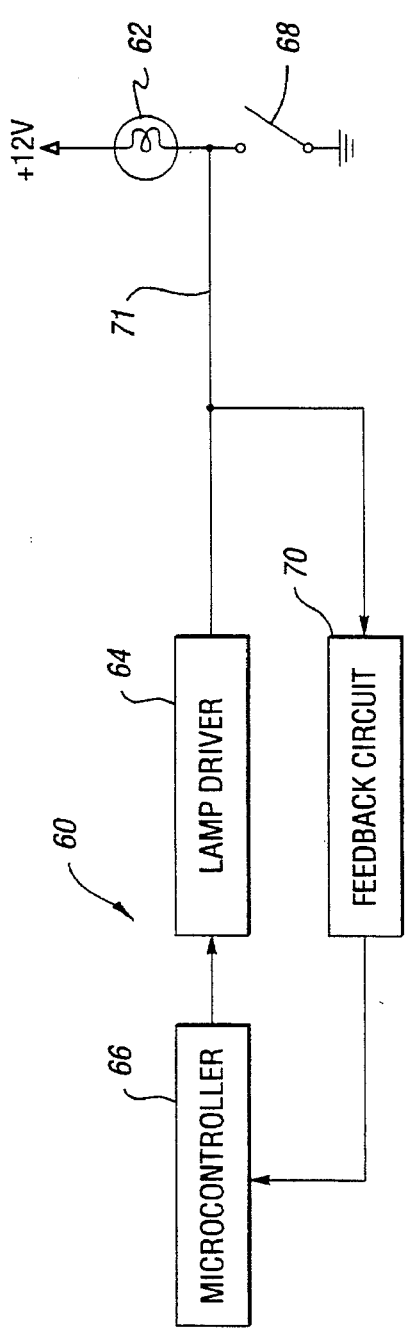
FIG. 2 is a block diagram of the system of the present invention.

Turning now to FIG. 2, a block diagram of the system of the present invention, denoted generally by reference numeral 60, is shown. The system 60 includes a vehicular lamp 62 for indicating whether the TC system is enabled or disabled. The lamp 62 is a typical dashboard lamp such as a #194 lamp. The lamp 62 is driven by a lamp driver 64 via a microcontroller 66.

A disable switch 68 is electrically coupled, preferably serially, to the driver side of the lamp 62. The disable switch 68 allows an operator of the vehicle to either enable or disable the TC system. The disable switch is preferably a normally open momentary switch, but may also be a single-pole, single-throw switch. Furthermore, a feedback circuit 70 from the disable switch 68 is electrically connected to the microcontroller 66 for monitoring the state of the disable switch 68.

The system 60 further includes a single multiplexed electrical connector 71 which allows the system 60 to operate in two distinct operating modes, a drive operating mode and a feedback operating mode. During the drive operating mode, the electrical connector 71 provides the lamp driver 64 to the lamp 62. During the feedback operating mode, the electrical connector 71 provides the feedback circuit 70 to the disable switch 68. Thus, the driver side voltage is feedback to the microcontroller 66 to identify the disable switch 68 being depressed and released when the microcontroller 66 is not turning ON the lamp 62 through the lamp driver 64. Therefore, when the lamp 62 is in either the OFF mode or the continuously on but pulse width modulated mode, as described below, this feedback can be monitored to identify the state of the disable switch 68.

Figure 3:
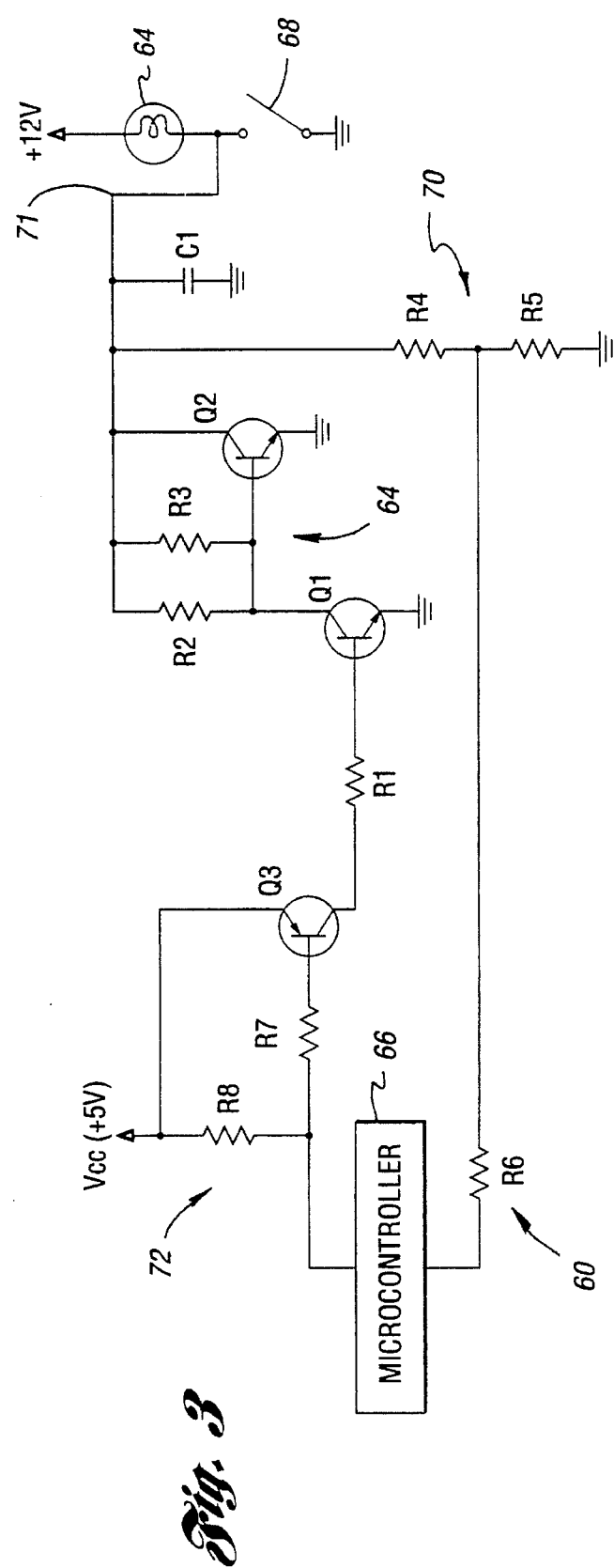
FIG. 3 is a schematic diagram of the system of the present invention.

Referring now to FIG. 3, there is shown a schematic diagram of the system 60 of the present invention. The lamp driver 64 comprises a self-bias ON circuit and a self-bias control circuit to defeat the self-bias feature. The self-bias control circuit includes a transistor Q1 and a resistor R1. The self-bias ON circuit includes a transistor Q2 and two resistors R2 and R3. When transistor Q1, preferably an MMBTA06 transistor, is ON, it pulls the base of transistor Q2, preferably an MJD122 Darlington transistor, low enough to keep transistor Q2 OFF. Thus, the lamp 62 is OFF. Conversely, when transistor Q1 is OFF, transistor Q2 is ON thereby causing the lamp 62 to be illuminated. The resistor R1, preferably 5.1 k$\Omega$, serves to limit the base current of transistor Q1. The resistors R2 and R3, preferably 3.3 k$\Omega$ each, serve to provide self-biased and current-limited base drive for transistor Q2.

The feedback circuit 70 comprises a voltage divider circuit including resistors R4 and R5, preferably 68 k$\Omega$ each. The feedback circuit 70 is electrically connected to the microcontroller 66 via a current limiter R6, preferably 51 k$\Omega$. The current limiter R6 insures an acceptable level of voltage and current is fed back from the lamp 62 to the microcontroller 66.

The system 60 further includes an inverter circuit 72 operatively coupled between the microcontroller 66 and the lamp driver 64. Upon power-up, the microcontroller 66 is held high until it is pulled low. In order to have the lamp 62 illuminated briefly upon power-up and then turned OFF after a predetermined amount of time, as will be described in detail below, the voltage from the microcontroller 66 is inverted. The inverter circuit 72 comprises resistors R7 and R8 and transistor Q3. Resistors R7 and R8 preferably have a value of 22 k$\Omega$ and 100 k$\Omega$, respectively, and transistor Q3 is preferably an MMBT3906 transistor. A grounded capacitor C1 electrically connected between the lamp 62 and the disable switch 68 is also provided for electromagnetic compatibility. The capacitor C1 is preferably 0.022 $\mu$F.

The lamp 62 has multiple control modes. A first mode is equivalent to the lamp 62 being OFF indicating the TC system is enabled. A second mode is equivalent to the lamp 62 being continuously ON indicating one of two possible situations: 1) a diagnostic command has requested the lamp 62 to be ON; and 2) a four-second check sequence is in progress during an ignition cycle.

A third mode is equivalent to the lamp 62 blinking at a predetermined frequency, e.g., 1 Hz, indicating there is a fault, such as a system fault, a communications fault, an engine fault, or a brake/hydraulic switch fault. The fourth mode is equivalent to the lamp 62 being pulse width modulated indicating one of three possible situations: 1) brake temperatures have been determined to be overheated; 2) the TC system has been disabled; and 3) a brake switch is stuck before a fault is set.

The operation of the system 60 of the present invention will now be described in conjunction with the timing diagram shown in FIG. 4. The TC system is automatically enabled upon vehicle ignition reset. Therefore, the lamp 62 is OFF until an operator of the vehicle depresses the disable switch 68. However, upon powering up the vehicle, a diagnostic check is performed. For the time period t1, e.g., four seconds, the microcontroller is held high causing transistors Q3 and Q1 to be off and transistor Q2 to be ON. Therefore, the lamp 62 is ON during the time period t1 after vehicle power-up.

After time period t1, the microcontroller 66 is pulled low. The transistors Q3 and Q1 are ON and transistor Q2 is OFF causing the lamp 62 to be OFF. The TC system is thus enabled until the operator of the vehicle depresses the disable switch 68, as indicated at time t2. The state of the disable switch 68 can be monitored since the lamp 62 is in the OFF mode. The TC system is then disabled only if the disable switch 68 is depressed for 250 msec and then released for 250 msec while the vehicle is stopped. The lamp 62 will be illuminated for 250 msec and then turned OFF for 250 msec since the depression of the disable switch 68 creates a ground path to illuminate the lamp 62.

After the cycling of the disable switch 68, i.e., 500 msec, the lamp 62 enters the fourth mode of operation at time t3 and is pulse width modulated. At time t3, the microcontroller 66 toggles between high and low at a duty cycle high enough so that the lamp 62 appears to be continuously illuminated. In the preferred embodiment, the lamp 62 is pulse width modulated at a duty cycle of 10 msec including an OFF period of 280 $\mu$sec. The state of the disable switch 68 is monitored during the 280 $\mu$sec OFF period. If the microcontroller 66 senses the disable switch 68 being depressed again, the TC system is re-enabled. The process is reversed and the lamp 62 is returned to the OFF mode indicating the TC system is enabled.

The system 60 of the present invention is not limited to the configuration or application described above. The system 60 may be used in other vehicle applications, such as in an anti-lock brake system. The system 60 may also be utilized in applications not requiring the output of the microcontroller 66 being inverted. Still further, the system 60 may be utilized in applications in which the lamp 62 is normally ON and is turned OFF only after detecting a momentary depression of the disable switch 68.

The advantages of the present invention are numerous. The present invention allows optimization of electrical connections by allowing the use of a single wire connection to a microcontroller for providing both a switch input as well as a lamp drive thus minimizing the number of wires used in a vehicle and the number of pins required by the microcontroller. The present invention also allows the illumination of the lamp to be varied based on information provided on the same input/output terminal.

While the best modes for carrying out the invention have been described in detail, those familiar with the art to which this invention relates will recognize various alternative designs and embodiments for practicing the invention as defined by the following claims. For example, although the present invention as been described in conjunction with a traction control system, it is apparent that the present invention applies to other applications in an automotive vehicle in which a switch is associated with a corresponding lamp.

What is claimed is:

1. In an automotive vehicle, a method for controlling the illumination of a lamp and for monitoring a state of a switch associated therewith, the method comprising:

generating a control signal having a drive operating mode and a feedback operating mode;

generating a feedback signal corresponding to the state of the switch during the feedback operating mode of the control signal;

generating a lamp drive signal during the drive operating mode of the control signal, the lamp drive signal for illuminating the lamp based on the feedback signal; and providing a single multiplexed connector, the connector establishing a path for the lamp drive signal to the lamp during the drive operating mode of the control signal and establishing a path for the feedback signal from the switch during the feedback operating mode of the control signal.

2. The method as recited in claim 1 wherein the step of generating the control signal includes the step of generating a pulse width modulated signal having a series of pulses and wherein the drive operating mode occurs during the presence of pulses and the feedback operating mode occurs during the absence of pulses.

3. The method as recited in claim 1 wherein the control signal is generated based on the feedback signal.

4. The method as recited in claim 1 wherein the lamp and the switch are connected in series.

5. The method as recited in claim 1 wherein the switch is a momentary switch.

6. The method as recited in claim 1 wherein the switch is a single-pole, single-throw switch.

7. In an automotive vehicle a system for controlling the illumination of a lamp and for monitoring a state of a switch associated therewith, the system comprising:

a controller for generating a control signal having a drive operating mode and a feedback operating mode;

a feedback circuit in communication with the controller for determining the state of the switch;

a lamp driver for generating a lamp drive signal during the drive operating mode of the control signal, the lamp drive signal causing illumination of the lamp based on the feedback signal; and a single multiplexed connector for establishing communication between the lamp driver and the lamp during the drive operating mode of the control signal and for establishing communication between the feedback circuit and the switch during the feedback operating mode of the control signal.

8. The system as recited in claim 7 wherein the control signal is a pulse width modulated signal having a series of pulses and wherein the drive operating mode occurs during the presence of pulses and the feedback operating mode occurs during the absence of pulses.

9. The system as recited in claim 7 wherein the control signal is generated based on the feedback signal.

10. The system as recited in claim 7 wherein the lamp and the switch are connected in series.

11. The system as recited in claim 7 wherein the switch is a momentary switch.

12. The system as recited in claim 7 wherein the switch is a single-pole, single-throw switch.

* * * * *